A. J. DONZE.
TOP FOR MILK PAILS.
APPLICATION FILED SEPT. 18, 1916.
1,236,277.
Patented Aug. 7, 1917.
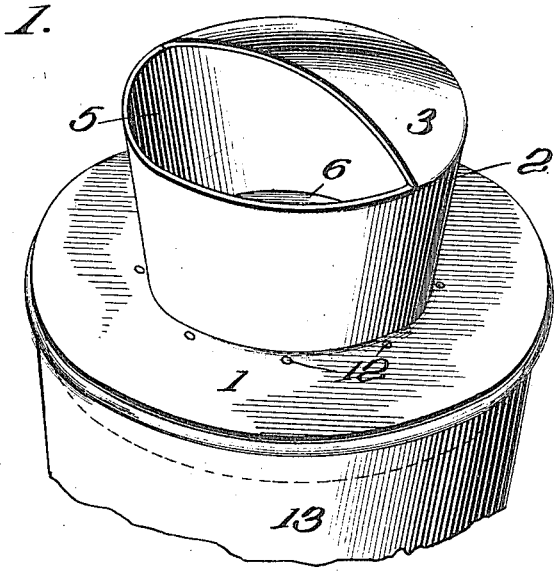
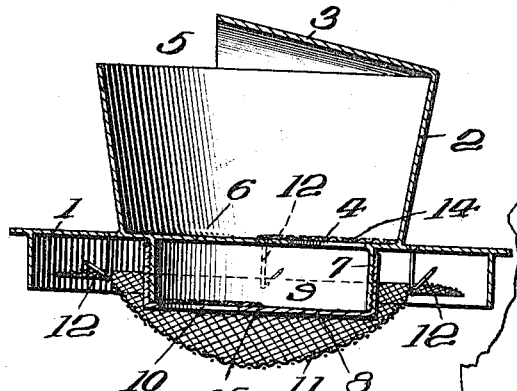
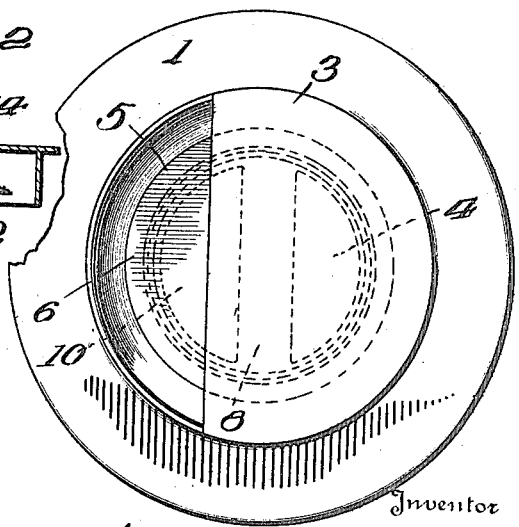
Witnesses
Lloyd R. Cornwall
L. L. Burket
Inventor
Annie J. Donze
By A. S. Pattison,
Attorney

UNITED STATES PATENT OFFICE.

ANNIE J. DONZE, OF KITTANNING, PENNSYLVANIA.

TOP FOR MILK-PAILS.

1,236,277. Specification of Letters Patent. Patented Aug. 7, 1917.

Application filed September 18, 1916. Serial No. 120,690.

*To all whom it may concern:*

Be it known that I, ANNIE J. DONZE, a citizen of the United States, residing at Kittanning, in the county of Armstrong and State of Pennsylvania, have invented certain new and useful Improvements in Tops for Milk-Pails, of which the following is a specification, reference being had therein to the accompanying drawing.

This invention relates to improvements in tops for milk pails, and its object is to prevent dirt and impurities from falling or passing into the milk pail during the milking operation.

In the accompanying drawings—

Figure 1 is a perspective view of my improved top for a milk pail.

Fig. 2 is a vertical central sectional view of my improved milk pail top.

Fig. 3 is a top plan view thereof.

My improvement consists in providing the top 1 with a centrally located upwardly projecting flange 2, which preferably tapers outwardly, as shown somewhat after the form of a funnel. A hood-shaped portion 3 forms a partial top for the flange 2, and the top 1 has an opening 4 therein located under the hood-shaped part 3. This opening 4 has a strainer 14 over it and is preferably much smaller than the hood 3, as shown clearly in Fig. 3, and may be of any desired shape, but is preferably of the shape shown in Fig. 3.

As shown, the hood portion 3 leaves an opening 5, which is located above the solid portion 6 of the cover 1.

Depending from the top 1 is a flange 7, and fitting and telescoping this flange 7 is a cup-shaped member 8, that is attachable by screwing on to and removable from the flange 7, the construction forming a chamber 9 located at the under side of the top 1. This cup-shaped member 8 is provided with an opening 10 below and much smaller than the solid portion 6 of the top 1. A suitable strainer 11 is suspended from the top 1 and completely surrounds the cup-shaped portion 8, and is below the opening 10. This strainer 11 may be made of any desired material, but is preferably of a suitable cloth, such, for instance, cheese cloth, and it is suspended upon suitable hooks or supports 12, by means of which it is readily attached to and removed from the top, for the purpose of being inclosed or being substituted by a new straining piece.

The top 1 is separate from the pail 13, so that it can be readily placed thereon and removed therefrom.

In the milking operation, the milk passes through the opening 5 and strikes the solid portion 6, then falls over to the other side and flows through the opening 4 on the solid part of the cup-shaped member 8 and then flows through a strainer 15 in the opening 10, and finally through the strainer 11 and then down into the pail.

By this arrangement a sanitary milk pail top is provided in that dirt and foreign matter is arrested and prevented from passing with the milk into the pail.

By the use of either one, or both of these strainers 14 and 15, together with the strainer 11, a triple straining of the milk can be provided when desired. Ordinarily, and preferably, I use the strainer 14 and cloth strainer 11, which in ordinary practice is amply sufficient.

The principal object of my construction is to provide a protection for the opening 4 and a solid portion against which to milk and which will arrest any foreign matter passing through the opening 5, and to further provide a solid portion below the opening 4 to further arrest any foreign matter which may enter through the opening 5, and to finally strain the milk as it passes through the opening 10. In this way a protection for the top opening is provided and a solid portion against which to milk and arrest foreign matter also provided and the milk required to pass in a zigzag course before it finally passes into the pail, thus providing two solid portions adapted to arrest the passing of dirt and foreign matter into the pail as well as the final strainer 11. It will also be understood that the cup-shaped portion 8 may be omitted, and there will still be a double straining through the screen 14 and cloth 11.

Having thus described my invention, what I claim and desire to secure by Letters Patent is—

1. An improved milk pail top having an upwardly extending flange, a hood extending partially over the upper end of the flange and leaving a milking opening, the top having an opening of an area smaller than the hood, and located in a vertical line under the hood, a cup-shaped member supported under the top and having an opening in its bottom out of line with the opening in the top, a strainer for the top opening and a second strainer for the opening in the bottom of the cup-shaped member.

2. An improved milk pail top having an upwardly extending flange, a hood extending partially over the upper end of the flange and leaving a milking opening, the top having an opening of an area less than the hood and located in a vertical line under the hood, the top having a depending flange, a cup-shaped member removably supported by the said flange and having an opening out of vertical alinement with the top opening, and strainers for the said openings.

3. An improved milk pail top having an upwardly extending flange, a hood extending partially over the upper end of the flange and leaving a milking opening, the top having an opening of an area smaller than the hood and located in a vertical line under the hood, a cup-shaped member removably supported under the top, the bottom of the cup-shaped member having an opening out of vertical alinement with the top opening, and a strainer located under the opening of the cup-shaped member.

In testimony whereof I hereunto affix my signature in the presence of two witnesses.

ANNIE J. DONZE.

Witnesses:
W. L. PEART,
W. E. McGARVEY.

Copies of this patent may be obtained for five cents each, by addressing the "Commissioner of Patents, Washington, D. C."